June 6, 1933.　　　　E. F. WATERBOR　　　　1,912,673
MOLDING DEVICE
Filed June 19, 1931　　　2 Sheets-Sheet 1
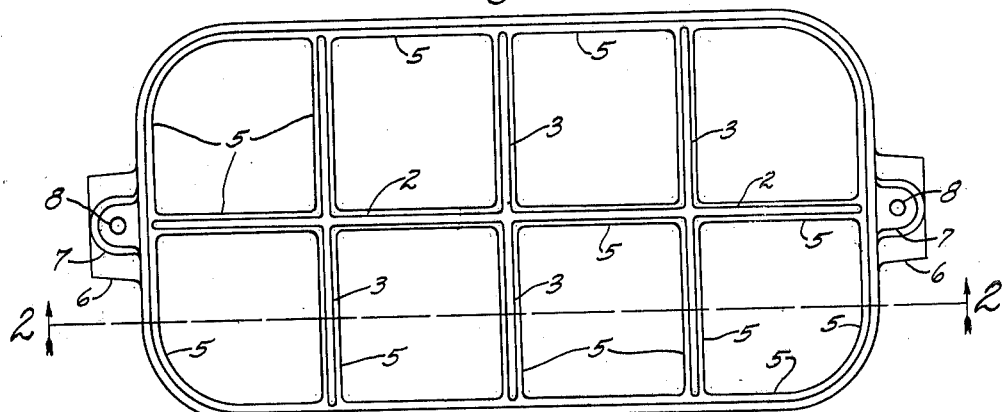
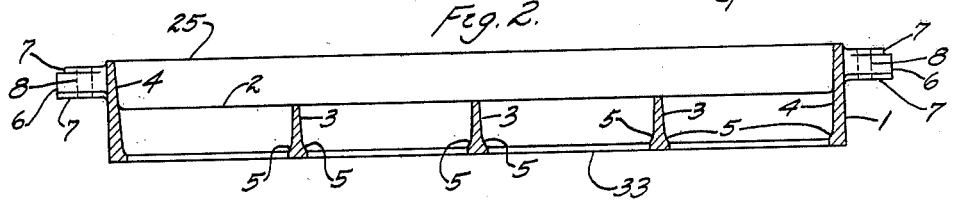
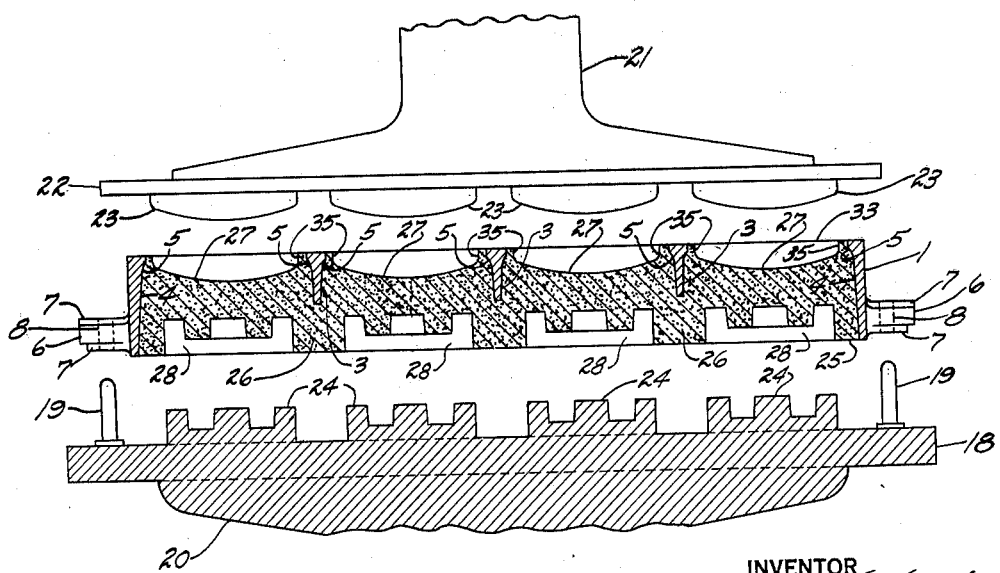
INVENTOR
Elmer F. Waterbor,
BY George B. Ingersoll
ATTORNEY

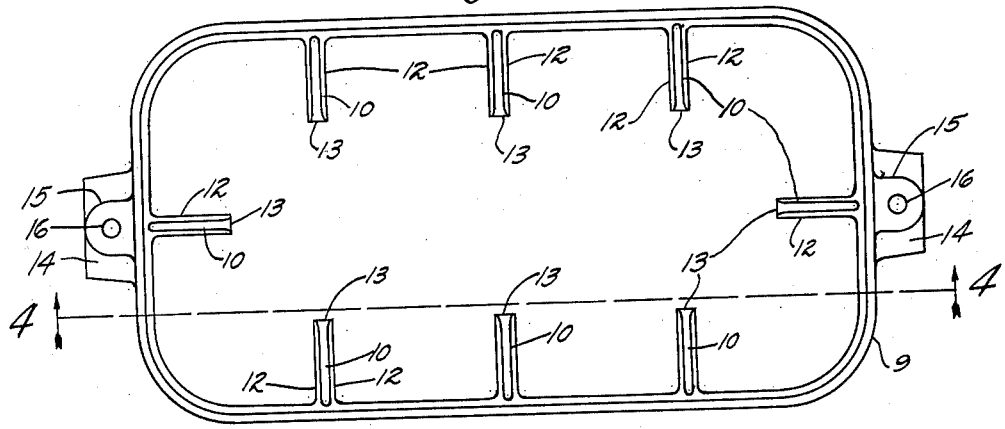
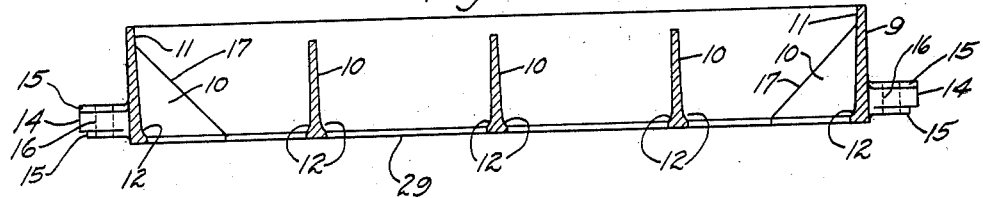
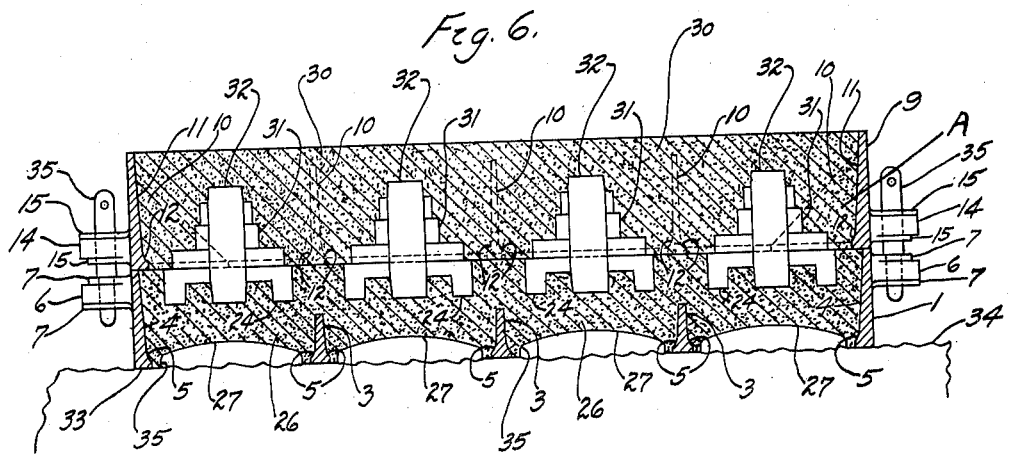

Patented June 6, 1933

1,912,673

UNITED STATES PATENT OFFICE

ELMER F. WATERBOR, OF DETROIT, MICHIGAN, ASSIGNOR TO MICHIGAN MALLEABLE IRON COMPANY, OF DETROIT, MICHIGAN, A CORPORATION OF MICHIGAN

MOLDING DEVICE

Application filed June 19, 1931. Serial No. 545,453.

My invention relates to improvements in a molding device as used in foundries and objects of my improvements are, first, to provide a molding device capable of being used without bottom boards; second, to provide a molding device provided with a drag portion having only partial contact, throughout its projected area, with its supporting member; third, to provide a molding device having a drag portion provided with a plurality of intersecting ribs extending across and lengthwise of the drag portion, the ribs being adapted to support the molding sand within the drag portion; fourth, to provide a molding device having a cope portion provided with cantilever extension portions for supporting sand within said cope portion; fifth, to provide a molding device having a body of molding material therein, said body comprising a plurality of arched portions; sixth, to provide a molding device requiring a lesser number of parts than the usual and ordinary type of molding devices, and seventh, to provide a molding device more easily handled in the molding operation.

I attain these objects by the mechanism illustrated in the accompanying drawings, in which—

Figure 1 is a plan view of the drag portion of the molding device; Fig. 2, a sectional view of the drag portion taken on the line 2—2, Fig. 1; Fig. 3, a plan view of the cope portion of the molding device; Fig. 4, a sectional view of the cope portion taken on the line 4—4, Fig. 3; Fig. 5, a view disclosing portions of a molding machine for producing powerful pressure on the sand in the molding device, together with the drag portion in a position in which the drag portion is being removed from the table portion of the molding machine; and Fig. 6, a vertical section of the molding device in a molding position on the ground or earthen floor of a foundry.

Similar numerals refer to similar parts throughout the several views:

The drag portion 1, hereinafter referred to as the drag, of the molding device is provided with the ribs 2 extending longitudinally thereof together with the ribs 3 extending transversely thereof, the ribs 2 and 3 intersecting. It is to be understood that any number of the ribs 2 or ribs 3 may be used as desired. The outer walls of the drag 1 are constructed with an inclined surface 4 on its inner side and the ribs 2 and 3 together with the outer walls are constructed with ledge portions 5 which provide the support for the molding sand as hereinafter further disclosed. The ledge portions 5 are constructed by making the ribs 2 and 3 and the outer walls, with their widest portions at the bottom of the drag 1, the ledge portions 5 joining the wall and rib portions with a radius to provide the support for the molding sand so hereinafter further disclosed.

It is to be noted that the ribs 2 and 3 extend only for a portion of the height of the drag 1, thus providing an ample and unobstructed space above the ribs 2 and 3 in the drag for the placement of the pattern and core equipment used in the drag 1 of the molding device.

The drag 1 is provided with the lugs 6 and the bosses 7, the lugs 6 being used as a handle for carrying the drag 1 as required in the molding operation, the bosses 7 being provided with the holes 8 for locating purposes as hereinafter disclosed. The cope portion 9, hereinafter referred to as the cope, is provided with the cantilever ribs 10 extending from the inclined surface 11 on the inner side of the outer walls of the cope 9, and the cantilever ribs 10 together with the outer walls are constructed with ledge portions 12 which provide the support for the molding sand as hereinafter further disclosed.

It is to be understood that any number of the cantilever ribs 10 may be used as desired. Also the ribs 10 may be so located in the cope 9 that they will be in alignment with the ribs 2 or 3 in the drag when the cope 9 is placed on the drag 1 as hereinafter disclosed.

The ledge portions 12 are constructed by making the cantilever ribs 10 and the outer walls of the cope with their widest portions at the bottom of the cope 9, the ledge portions 12 joining the wall portions with a radius to provide the support for the molding sand as hereinafter further disclosed.

It is to be noted that the cantilever ribs 10 extend only for a portion of the height of the cope 9 and also extend out from the inclined surface 11 only sufficiently far to support the molding sand in the cope 9, the space between the inner ends 13 of the cantilever ribs 10 thus providing an ample and unobstructed space for the placement of the pattern and core equipment used in the cope 9 of the molding device.

The cope 9 is provided with the lugs 14 and the bosses 15, the lugs 14 being used as a handle for carrying the cope 9 as required in the molding operation, the bosses 15 being provided with the holes 16 for locating purposes as hereinafter disclosed.

It is also to be noted that cantilever ribs 10 are inclined at their upper ends as at 17, thus providing for easy filling with and removal of molding sand in the cope 9, the inclined ends 17 of the ribs 10 further permitting ease of handling of the pattern and core equipment in the cope 9 without interference with the ribs 10.

A molding machine may be provided with a table 18 which in turn is provided with the dowels 19 which are adapted to enter the holes 8 of the bosses 7 and lugs 6 of the drag 1 thus providing for the proper locating of the drag 1 and for retaining the drag 1 on the table 18 when the drag 1 is being rammed with sand.

The table 18 may be suitably supported on the base of the molding machine, the base being partially shown at 20.

The molding machine may be further provided with the ram member 21 which is suitably mounted on extensions (not shown) of the base 20, the ram member 21 being suitably reciprocated by power means (not shown) to enable the ram member 21 to produce a powerful pressure on the sand of the molding device.

The ram member 21 is suitably provided with a pressure head 22 on which are suitably supported the projecting portions 23.

In operation, the patterns 24 are suitably located and mounted on the table 18. The drag 1 is placed on the table 18 with its side 25 next to the upper surface of the table 18, the holes 8 of the bosses 7 fitting around the dowels 19 of the table 18.

The molding sand 26 is placed in the drag 1 and is now pressed and rammed into the drag 1 around the patterns 24 by the pressure of the reciprocating ram member 21, the projecting portions 23 of the pressure head 22 entering the upper portion of the drag 1 and forming the arched portions 27 in the molding sand 26. When the projecting portions 23 are forming the arched portions 27 in the molding sand 26, the molding sand 26 will be firmly pressed vertically around the patterns 24 and also transversely and longitudinally against the inclined surfaces 4 of the side walls of the drag 1 and the inclined surfaces of the ribs 2 and 3 of the drag 1, the molding sand 26 further being packed and rammed into the drag 1 behind the ledge portions 5 of the side walls and of the ribs 2 and 3 of the drag 1.

It will thus be noted that after the sand ramming operation, the drag 1 may be lifted from the table 18, the drag 1 being disclosed in a removed position above the table 18 in Fig. 5; the molding sand 26 being effectively retained in the drag 1, in its inverted position, by adhesion to the ledge portions 5 and the inclined surfaces of the ribs 2 and 3 and of the side walls.

The molding sand 26 now contains the recesses or imprints 28 made by the patterns 24. The cope 9 may now be placed on the table 18 in a similar way to that of the drag 1, as above disclosed, the side 29 of the cope 9 being placed next to the upper surface of the table 18, the holes 16 of the bosses 15 fitting around the dowels 19. The molding sand 30 is now placed in the cope 9 around the desired pattern equipment and pressed and rammed around same, the molding sand 30 being firmly pressed against the inclined surfaces 11 of the inner side of the outer wall, the inclined surfaces of the cantilever ribs 10, and the ledge portions 12 of the cope 9.

It is to be noted that the molding sand 26 is rammed into the inverted drag 1 by the projecting portions 23 on the head 22, the molding sand 26 being forced around and under and back of the ledge portions 5 whereas the cope 9, being always maintained in its upright or normal position, the molding sand 30 may be pressed and rammed directly on to the ledge portions 12 and the cantilever ribs 10 without the necessity of forming arched portions as at 27 in the drag. This may be accomplished by removing the projecting portions 23 and leaving the pressure head 22 with a flat surface, or if desired the ramming may be accomplished by hand methods.

Imprints of pattern equipment in the cope 9 are indicated by the recesses 31, a core member being indicated at 32. It is to be especially noted that the drag 1 with its mold may now be turned over, from its inverted position in Fig. 5, to its normal or upright position in the molding operation, as disclosed in Fig. 6, the side 33 being placed on a desired portion of the molding room floor 34, thus eliminating the use of the usual bottom or pattern boards as universally used in foundrys for supporting the flask and its mold. This is accomplished by means of the molding sand 26 being retained in the inverted drag 1, by the adhesion of the molding sand 26 to the ledge portions 5 and the inclined surfaces of the ribs 2 and 3 of the side walls and also by the greater portion of the molding sand 26 being removed from contact with the molding room floor 34 through the formation of the arched portions 27, the drag 1, as disclosed in Fig. 6, resting on the molding room floor 34, through the medium of the narrow surfaces extending around the side 33 of the outer wall and along the side 33 of the ribs 2 and 3, the molding sand 26 being formed with the narrow ledges 35 adjacent the ledge portions 5.

It is to be noted that this elimination of the usual bottom or pattern boards for supporting the complete flask and mold, during the molding operation, will constitute a great saving in foundry equipment, as bottom boards must first be provided and then replaced at regular intervals as they are quickly depreciated and completely worn out by wear and by handling or by burning. Also every mold produced in this way will each require a bottom board. The bottom boards must be strong and heavy and often are two and three inches in thickness as they must not become warped or twisted. Also bottom boards must remain under the flasks until the molds have been poured off and shaken out, thus tying up expensive equipment during long intervals of time.

With my invention this great equipment expense is eliminated and it is only necessary to select a portion of the molding floor for supporting the flasks and their molds without further equipment being necessary between the flasks and the molding room floor.

The projecting portions 23 of the pressure head 22 may be made of any desired shape and size to properly form the arched portions 27 and to properly ram and pack the molding sand 26 into the drag 1.

When the drag 1 has been placed on the molding room floor 34, as disclosed in Fig. 6, the cope 9 may be placed on the drag 1, the flask or dowel pins 35 being fitted into the holes 8 of the drag 1 and the holes 16 of the cope 9 thus locating and matching the cope 9 and drag 1 in proper relationship during the molding operation. The holes 8 of the drag 1 may be constructed of slightly smaller size than the holes 16 of the cope 9 so that the flask pins 35, when made with a shouldered portion to fit both holes 8 and 16, the flask pin will not drop through or away from its locating or matching position, as disclosed in Fig. 6.

It is also to be noted that the cope 9, with its molding sand rammed into position, may be readily transported without any further bottom support, the molding sand being supported in the cope 9 by adhesion with the inclined surfaces 11 of the outer walls and of the cantilever ribs 10, together with the ledge portions 12.

It is to be further understood that the inclined surfaces 4 of the marginal walls and of the ribs 2 and 3 of the drag 1 will prevent, by adhesion, the molding sand 26 from dropping out of the drag 1 when the drag 1 is being removed from the table 18 of the base 20 of the molding machine as disclosed in Fig. 2, while the arched portions 27 of the rammed and packed molding sand 26 will permit the molding sand 26 to be supported on the ledge portions 5 together with the inclined surfaces 4 of the marginal walls and of the ribs 2 and 3, as disclosed in Fig. 6, without the necessity of any molding boards being placed between the base of the drag 1, together with its molding sand 26, and the floor 34 of a foundry.

It is to be further noted that my molding device will be more easily handled than the usual type of such equipment employing a bottom board, as it eliminates the hazard in handling and turning over the drag and its mold together with a bottom board.

I claim:

1. In a molding device for use on the floor of a foundry, a flask member provided with peripheral walls and intersecting ribs extending between said peripheral walls, the inside longitudinal surfaces of said peripheral walls and a plurality of the longitudinal surfaces of each of said intersecting ribs being inclined from a plane extending through a vertical center of said walls and said ribs, said peripheral walls and said intersecting ribs being provided with ledges extending approximately at right angles, from said peripheral walls and said intersecting ribs, said ledges being provided with a surface for supporting the molding device on the floor of the foundry, said ledges being further provided with radial surfaces extending from the edge of said ledges to the inclined longitudinal surfaces of said peripheral walls and said intersecting ribs.

2. In a molding device, the combination of a flask member provided with side walls and intersecting ribs therebetween, each of said side walls and said ribs being provided with a ledge extending approximately at right angles, said ledges having supporting surfaces for said flask member, said supporting surfaces extending in a common plane, and a molding unit in said flask member, said molding unit being supported on said ledges extending at approximately right angles with said walls and said ribs, said molding unit being further provided with relatively narrow supporting surfaces extending adjacent said ledge portions of said side walls and said ribs, said narrow supporting surfaces of said molding unit extending in the common plane of the supporting surfaces of said ledges of said side walls and said ribs.

3. In a molding device, the combination of a flask member provided with a plurality of rib members each provided with tapered ledge portions extending approximately at right angles to said rib members, and a molding unit in said flask member, said molding unit being provided with a relatively narrow portion adjacent the edges of said tapered ledge portions, the relatively narrow portions of said molding unit having supporting surfaces extending in the same plane as the bottom of said ledge portions.

4. In a molding device for use on a foundry floor, the combination of a flask member provided with side walls and intersecting ribs, each of said ribs and side walls having surfaces contacting the foundry floor, and a molding unit in said flask member, said molding unit being provided with relatively narrow supporting surfaces, adjacent said side walls and said ribs, for contacting the foundry floor, said molding unit being further provided with arched recesses between its relatively narrow supporting surfaces adjacent said side walls and said ribs.

5. In a molding device for use on the floor of a foundry, the combination of a flask member provided with side walls and intersecting ribs therebetween, each of said side walls and said ribs being provided with tapered ledges extending approximately at right angles therefrom, said tapered ledges having supporting surfaces extending in a single plane for contacting the foundry floor, and a molding unit in said flask member, said molding unit being provided with relatively narrow supporting surfaces extending adjacent said tapered ledges, said relatively narrow supporting surfaces of said molding unit extending in the same plane as the supporting surfaces of said tapered ledges, said relatively narrow supporting surfaces of said molding unit being thereby adapted to contact the floor of the foundry, said molding unit being further provided with arched recesses between its said relatively narrow supporting surfaces, said arched recesses being thereby adapted to be free of contact with the floor of the foundry.

6. In a molding device supported in contact with the floor of a foundry, the combination of a flask member provided with a plurality of outside vertically extending wall portions together with vertically extending ribs between said outside vertically extending wall portions, said outside vertically extending wall portions and said vertically extending ribs being provided with enlarged portions having supporting surfaces extending in a common plane for contacting with the floor of the foundry, and a molding sand unit contacting the inside longitudinal surfaces of said outside vertically extending wall portions and a plurality of longitudinal surfaces of each of said vertically extending ribs, said molding sand unit being provided with a plurality of arched recesses each surrounded by said supporting surfaces of the enlarged portions of the outside vertically extending wall portions and the vertically extending ribs of said flask member.

7. In a molding device adapted to be supported on the floor of a foundry without the use of bottom boards therebetween, a flask member provided with vertically extending outside wall portions having inner longitudinal surfaces inclined from a vertical plane, said flask member being provided with a plurality of ribs, said intersecting ribs extending to and being connected with the inner longitudinal surfaces of said outside wall portions said ribs having a lesser height than the height of said vertically extending outside wall portions, said vertically extending wall portions and said ribs being provided with ledge portions having a supporting surface extending along one side of said flask member for contacting with the floor of the foundry.

8. In a molding device supported on the floor of a foundry without bottom boards therebetween, the combination of a flask member having vertically extending outside wall portions provided with inside surfaces inclined relative to a vertical plane, said flask member being further provided with a plurality of ribs connected with said inclined inside surfaces of said vertically extending outside wall portions, said ribs being provided with oppositely disposed surfaces inclined relative to a vertical plane, said vertically extending outside wall portions and said ribs being provided with ledge portions at one of their ends, said ledge portions being provided with a supporting surface contacting the floor of the foundry, and a sand unit in said flask member, said sand unit being provided with arched portions between ledge portions, said arched portions closely adhering to said inclined surfaces and to said ledge portions of said flask member.

9. In a molding device supported on a floor or similar surface, the combination of a flask member provided with a peripheral vertically extending wall, said wall being provided with an inwardly extending ledge portion located at one of its ends, said ledge portion being provided with a supporting surface for contacting said floor or similar surface, and a sand unit in said flask member, said sand unit having relatively narrow support surfaces for contacting said floor or similar surface, said relatively narrow surfaces extending adjacent the inwardly extending ledge portion of said wall, the relatively narrow support surfaces of said sand unit extending in the same plane as the supporting surface of the ledge portion of said wall.

10. In a molding device for use on a floor or similar supporting surface the combination of a flask member provided with outside vertically extending walls having inside surfaces inclined at an angle with a vertical plane, said flask member being further provided with vertically extending ribs extending between said vertically extending walls, said vertically extending ribs having a plurality of surfaces inclined at an angle with a vertical plane, said vertically extending walls and said vertically extending ribs being provided with ledge portions located at one side of the flask member, said ledge portions having a surface for contacting said floor or similar supporting surface, and a sand unit in said flask member, said sand unit being provided with a plurality of portions each having peripheral surfaces for contacting said floor or similar supporting surface, said peripheral surfaces extending adjacent said surface of said ledge portions, said sand unit being further provided with dome shaped recesses adjacent said peripheral surfaces.

Detroit, Michigan, June 3, 1931.

ELMER F. WATERBOR.